United States Patent
Burkhardt et al.

(10) Patent No.: US 9,238,397 B2
(45) Date of Patent: Jan. 19, 2016

(54) MOTOR VEHICLE AIR CONDITIONING ARRANGEMENT

(75) Inventors: Carsten Burkhardt, Kuenzelsau (DE); Holger Gundel, Gerlingen (DE); Sascha Lindauer, Alfdorf (DE); Gebhard Schweizer, Leonberg (DE)

(73) Assignee: MAHLE International GmbH, Stuttgart (DE)

( * ) Notice: Subject to any disclaimer, the term of this patent is extended or adjusted under 35 U.S.C. 154(b) by 1546 days.

(21) Appl. No.: 12/297,881

(22) PCT Filed: Apr. 3, 2007

(86) PCT No.: PCT/EP2007/002975
§ 371 (c)(1),
(2), (4) Date: Oct. 21, 2008

(87) PCT Pub. No.: WO2007/124833
PCT Pub. Date: Nov. 8, 2007

(65) Prior Publication Data
US 2009/0078392 A1    Mar. 26, 2009

(30) Foreign Application Priority Data
Apr. 28, 2006    (DE) .......................... 10 2006 020 377

(51) Int. Cl.
*B60H 1/00* (2006.01)

(52) U.S. Cl.
CPC ........ *B60H 1/00028* (2013.01); *B60H 1/00207* (2013.01)

(58) Field of Classification Search
CPC ........... B60H 1/00021; B60H 1/00028; B60H 1/00207; B60H 1/00271; B60H 1/00285; B60H 1/00007; B60H 1/0005; F25B 27/00; F25B 29/00
USPC ........... 165/42, 43, 44, 202, 203, 204; 62/244
See application file for complete search history.

(56) References Cited

U.S. PATENT DOCUMENTS

| | | | | |
|---|---|---|---|---|
| 2,294,036 | A * | 8/1942 | Kettering | 62/244 |
| 4,494,597 | A | 1/1985 | Fukami et al. | |
| 4,828,018 | A * | 5/1989 | Hoffman | 165/42 |
| 4,898,325 | A * | 2/1990 | Sakurada | 165/203 |
| 5,222,372 | A * | 6/1993 | DeRees et al. | 62/244 |
| 5,450,894 | A * | 9/1995 | Inoue et al. | 165/43 |
| 5,715,997 | A * | 2/1998 | Ito et al. | 165/43 |
| 5,755,107 | A | 5/1998 | Shirota et al. | |
| 5,803,166 | A * | 9/1998 | Ito et al. | 165/203 |
| 5,860,593 | A * | 1/1999 | Heinle et al. | 165/204 |
| 6,059,018 | A * | 5/2000 | Yoshinori et al. | 165/42 |
| 6,101,828 | A | 8/2000 | Shikata et al. | |
| 6,131,652 | A * | 10/2000 | Ito et al. | 165/204 |

(Continued)

FOREIGN PATENT DOCUMENTS

| DE | 195 34 738 | 3/1996 |
|---|---|---|
| DE | 197 53 877 | 6/1998 |

(Continued)

*Primary Examiner* — Ljiljana Ciric
(74) *Attorney, Agent, or Firm* — Leydig, Voit & Mayer (57) ABSTRACT

A motor vehicle air conditioning arrangement having a heater (H) and an evaporator (V) which are arranged in an air guiding housing (2). Each of the heater and evaporator have a plane that is traversed perpendicularly by air and have an inclined position such that the planes are each arranged at an angle of less than 40° with respect to the horizontal plane (E).

6 Claims, 6 Drawing Sheets

(56) References Cited

U.S. PATENT DOCUMENTS

| | | | |
|---|---|---|---|
| 6,152,217 A * | 11/2000 | Ito et al. | 165/202 |
| 6,186,887 B1 | 2/2001 | Dauvergne | |
| 6,223,807 B1 * | 5/2001 | Asche et al. | 165/43 |
| 6,282,911 B1 * | 9/2001 | Watanabe et al. | 62/244 |
| 6,301,909 B1 * | 10/2001 | Hayasaka | 62/175 |
| 6,397,942 B1 * | 6/2002 | Ito et al. | 165/203 |
| 6,427,771 B1 * | 8/2002 | Kako et al. | 165/204 |
| 6,454,178 B1 * | 9/2002 | Fusco et al. | 165/203 |
| 6,491,578 B2 * | 12/2002 | Yoshinori et al. | 165/203 |
| 6,598,665 B2 * | 7/2003 | Schwarz | 165/42 |
| 6,793,016 B2 * | 9/2004 | Aoki et al. | 165/202 |
| 6,871,696 B2 * | 3/2005 | Aoki et al. | 165/43 |
| 6,978,634 B2 * | 12/2005 | Aoki | 62/244 |
| 7,013,656 B2 * | 3/2006 | Yanagimachi et al. | 165/202 |
| 7,137,445 B2 * | 11/2006 | Kushner et al. | 165/203 |
| 7,380,587 B2 * | 6/2008 | Naruse et al. | 165/202 |
| 7,681,630 B2 * | 3/2010 | Klassen et al. | 165/202 |
| 7,913,746 B2 * | 3/2011 | Hirooka et al. | 165/42 |
| 7,937,954 B2 * | 5/2011 | Kang et al. | 62/244 |
| 8,056,617 B2 * | 11/2011 | Klassen et al. | 165/202 |
| 8,187,736 B2 * | 5/2012 | Park et al. | 165/202 |
| 8,230,689 B2 * | 7/2012 | Kmetz et al. | 62/244 |
| 8,511,371 B2 * | 8/2013 | Onda et al. | 165/202 |
| 2001/0029162 A1 * | 10/2001 | Yoshinori et al. | 454/137 |
| 2002/0000314 A1 * | 1/2002 | Danieau | 165/203 |
| 2002/0129932 A1 * | 9/2002 | Nagata et al. | 165/202 |
| 2002/0153132 A1 * | 10/2002 | Nagano | 165/202 |
| 2003/0217833 A1 | 11/2003 | Alber et al. | |
| 2004/0093885 A1 * | 5/2004 | Ito et al. | 62/244 |
| 2004/0194947 A1 * | 10/2004 | Ito et al. | 165/203 |
| 2004/0200611 A1 * | 10/2004 | Tamatsu | 165/203 |
| 2005/0011640 A1 * | 1/2005 | Tohda et al. | 165/202 |
| 2005/0067158 A1 * | 3/2005 | Ito et al. | 165/204 |
| 2005/0202772 A1 * | 9/2005 | Roland et al. | 454/69 |
| 2005/0205247 A1 * | 9/2005 | Ezaki et al. | 165/204 |
| 2005/0269071 A1 * | 12/2005 | Simmet et al. | 165/202 |
| 2005/0279489 A1 * | 12/2005 | Kushner et al. | 165/203 |
| 2006/0000592 A1 * | 1/2006 | Bosquet et al. | 165/202 |
| 2006/0042788 A1 * | 3/2006 | Naruse et al. | 165/202 |
| 2006/0060342 A1 | 3/2006 | Yamamoto | |
| 2006/0196205 A1 | 9/2006 | Richter et al. | |
| 2007/0193292 A1 * | 8/2007 | Itoh | 62/239 |
| 2008/0066480 A1 * | 3/2008 | Kamiyama et al. | 62/244 |
| 2008/0110184 A1 * | 5/2008 | Hirooka et al. | 62/244 |

FOREIGN PATENT DOCUMENTS

| | | |
|---|---|---|
| DE | 198 07 002 | 10/1998 |
| DE | 198 58 727 | 7/1999 |
| DE | 102 13 347 | 10/2003 |
| DE | 10 2005 009 325 | 8/2006 |
| EP | 1 457 366 | 9/2004 |
| FR | 2 783 465 | 3/2000 |
| JP | 63-13810 | 1/1988 |
| JP | 2004-175269 | 6/2004 |
| JP | 2005-297778 | 10/2005 |

* cited by examiner

MOTOR VEHICLE AIR CONDITIONING ARRANGEMENT

BACKGROUND OF THE INVENTION

The invention pertains to a motor vehicle air conditioning arrangement.

In conventional motor vehicle air conditioning systems, the heater and the evaporator are usually arranged upright and essentially parallel to one another such that they can be traversed by air with the least losses possible.

Arrangements of auxiliary air conditioners in the center console or behind a wheel housing are also known. A heater may also be arranged in connection with an air conditioner, i.e., an evaporator. In this case, the components are also arranged essentially upright and in the direction of the longitudinal vehicle axis.

DE 195 34 738 A1 discloses a motor vehicle air conditioning system that features an offset fan for blowing air, an evaporator that is centrally arranged in the dashboard and receives air from below, as well as a heater that is arranged above the evaporator approximately horizontally. In this case, the evaporator is inclined downward along the direction of the air flow in order to discharge condensation water. The evaporator is preferably inclined relative to the horizontal line by an angle of 10 to 30°. The two heat exchangers, i.e., the evaporator and the heater, are arranged in different planes and essentially in alignment, and the flow path of the air through them is as short as possible in order to realize a largely compact air conditioning system.

However, air conditioning arrangements of this type leave something to be desired.

BRIEF SUMMARY OF THE INVENTION

The invention is based on the objective of making available an improved motor vehicle air conditioning arrangement.

The invention proposes a motor vehicle air conditioning arrangement with at least one heater and at least one evaporator that are arranged in an air conduction housing, wherein the heater and the evaporator are arranged in an inclined position such that the planes of the evaporator and the heater, through which the air flows perpendicularly, are respectively arranged relative to the horizontal plane at an angle of less than 40°, preferably less than 30°, particularly an angle of less than 25°, especially in the installation position in a motor vehicle. According to one particularly preferred embodiment, at least one of the heat exchangers is arranged at an angle of less than 20° relative to the horizontal plane. In such a flat assembly, the air conditioning system can be arranged above or underneath the vehicle floor, wherein the heat exchangers can be successively arranged almost horizontally and, if applicable, in a slightly overlapping fashion. However, a maximum overlap is defined in such a way that the projections of the evaporator and the heater on a horizontal plane can overlap by no more than half of the surface of the heater projected on the horizontal plane.

According to one preferred embodiment, both heat exchangers are inclined in one direction, however, at angles of inclination that preferably differ slightly.

The heat exchangers can also be inclined in opposite directions, preferably in a V-shaped fashion. In this case, the angles of inclination also are not necessarily identical, but preferably differ from one another.

The heater and the evaporator are advantageously arranged such that the inflow surface of the evaporator and the outflow surface of the heater are arranged at an angle greater than 100° and less than 180°, particularly greater than 120°, more particularly an angle greater than 130°. According to one particularly preferred embodiment, the inflow surface of the evaporator and the outflow surface of the heater are arranged at an angle greater than 140°.

It is particularly preferred to arrange the heater at a flatter angle of inclination than the evaporator such that a sufficiently large bypass can be provided for the air to be conducted past the heater.

The evaporator and the heater preferably overlap, particularly if the heat exchangers are inclined in directions that correspond to one another, wherein the projection of the evaporator and the heater on a horizontal plane corresponds to an overlap of no more than one-third of the surface of the heater projected on the horizontal plane, particularly no more than one-fourth.

A fan is preferably arranged adjacent to the evaporator and the heater, wherein the air arriving from the fan is deflected before it flows into the evaporator, preferably from a direction extending opposite the normal driving direction of the motor vehicle into a direction extending perpendicular thereto, and wherein a slight upward or downward deflection is also realized.

The evaporator and the heater preferably can be traversed by air at an angle of no more than 30° referred to the normal driving direction, particularly perpendicular to the normal driving direction of the motor vehicle. With the exception of a possible overlap in certain sections, the evaporator and the heater therefore preferably are essentially arranged adjacently rather than successively as is the case in conventional air conditioning arrangements.

An inventive air conditioning arrangement is preferably arranged underneath the driver's seat and/or front passenger's seat and/or a seat of the second row or another row of seats and/or underneath a footwell and/or in the trunk.

In this case, a fan is preferably arranged in the motor vehicle in the normal driving direction thereof, namely upstream and at the height of the evaporator and the heater.

It is particularly preferred to partially arrange an inventive air conditioning arrangement underneath the driver's seat or the front passenger's seat and underneath the footwell of the second row of seats, wherein the fan is preferably arranged underneath the driver's seat or the front passenger's seat and the evaporator and the heater are preferably arranged underneath a footwell of the second row of seats such that a particularly space-saving arrangement of the air conditioning system can be realized, particularly for vans, in which a relatively large structural height is available.

BRIEF DESCRIPTION OF THE DRAWINGS

One exemplary embodiment of the invention and four general arrangements thereof with variations are described in detail below with reference to the drawings. In these drawings.

DETAILED DESCRIPTION OF THE INVENTION

Figure 1:
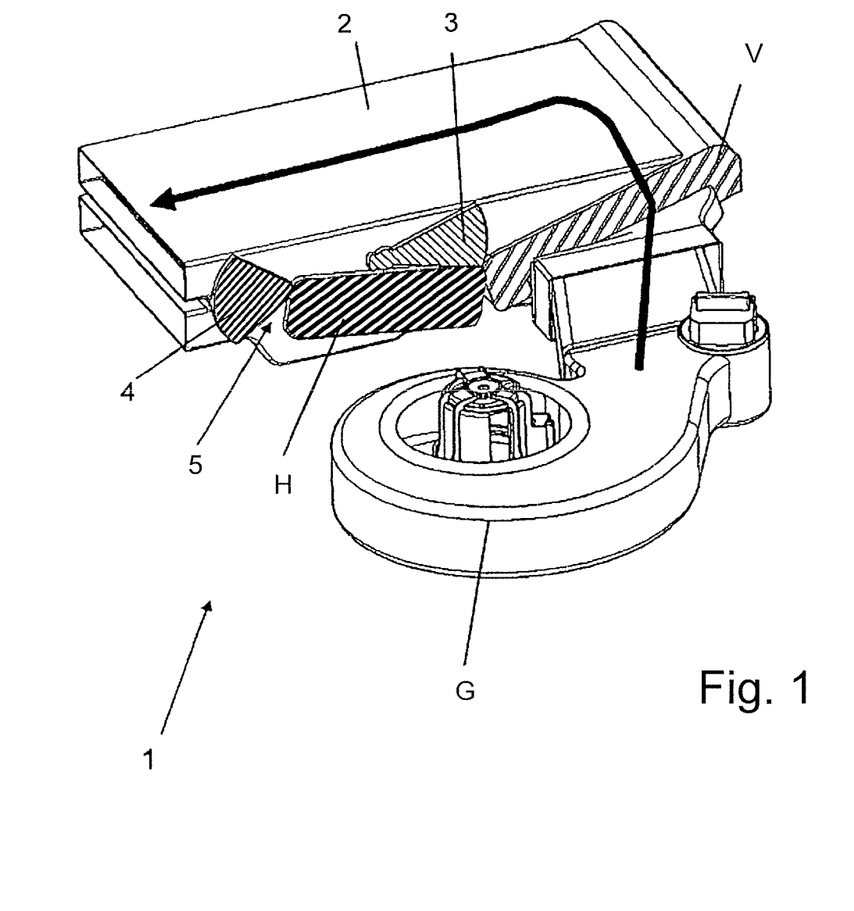
FIG. 1 shows a schematic perspective representation of a motor vehicle air conditioning system according to the embodiment.

A motor vehicle air conditioning system 1 according to the first embodiment features a multi-part air conduction housing 2, wherein said housing contains a fan G that takes in recirculated air from the vehicle interior and/or fresh air from the surroundings of the motor vehicle, an evaporator V that serves for tempering the air and a heater H.

The entire air conditioning system 1 is designed very flat. In this case, the fan G is arranged underneath the driver's seat in an intermediate space above the vehicle floor and the evaporator V and the heater H are arranged in a footwell of the second row of seats. The driving direction is indicated by an arrow in FIG. 1 and essentially extends perpendicular to the air flow direction through the evaporator V and the heater H, wherein the fan G is arranged in the motor vehicle upstream of the heat exchangers H and V.

Figure 2:
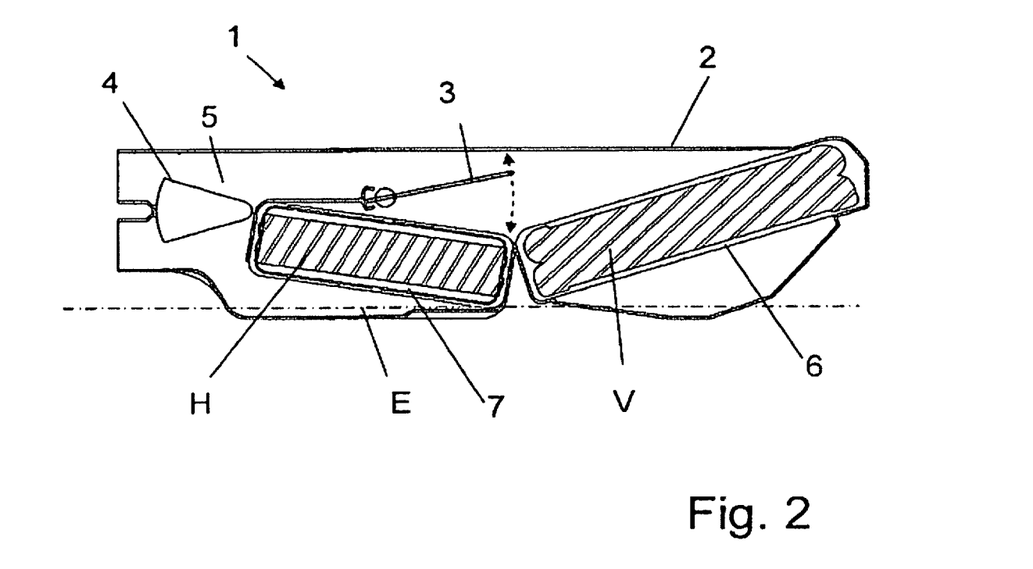
FIG. 2 shows a schematic cross section through part of the air conditioning system according to FIG. 1.

Referred to the air flow direction, the evaporator V is arranged upstream of the heater H, wherein the entire air flows through the evaporator V that is arranged almost horizontally and inclined opposite the air flow direction. The heater H is inclined in the air flow direction, wherein air only flows through the heater if so required and, if applicable, in the form of a partial air flow only. Both heat exchangers H and V are respectively inclined relative to the horizontal line by an angle of less than 40°, i.e., a very low structural height is achieved. The inflow surface 6 of the evaporator V and the outflow surface 7 of the heater H are then accordingly arranged at an angle greater than 100°. In this embodiment, the evaporator V is inclined by an angle of 17° and the heater H is inclined by an angle of 10° such that the angle between the inflow surface 6 of the evaporator V and the outflow surface 7 of the heater has a value of 153°. Due to the different directions of inclination, the evaporator V and the heater H are arranged in a V-shaped fashion, wherein the "V" is opened wide and slightly inclined rearward in the air flow direction due to the different angles of inclination.

In the present case, the distribution of the air flow arriving from the fan G is controlled by a single temperature mixing valve 3 that is arranged above the heater H and the pivoting axis of which is arranged in the vicinity of the center of the upper side and slightly above the upper side, namely in the longitudinal direction of the vehicle in the present case, wherein said temperature mixing valve distributes the air to individual air ducts by means of an air distribution valve 4 that is arranged downstream of the heater H and the pivoting axis of which also extends in the longitudinal direction of the vehicle in this case.

The pivoting axis of the temperature mixing valve 3 lies below the upper edge of the evaporator V as indicated in FIG. 2 such that this valve does not increase the structural height. The pivoting axis of the air distribution valve 4 is arranged about centrally referred to the structural height of the evaporator V and on the upper corner of the heater H such that this valve also does not affect the structural height.

From the blower G, the air flow path of the air is realized such that the air in the inflow region of the evaporator V is deflected upward and in the direction of the front passenger's seat from the original flow direction that extends opposite the normal driving direction of the motor vehicle, i.e., the air flows obliquely into the evaporator V from below, wherein the air duct becomes smaller opposite the normal driving direction of the motor vehicle such that all regions of the evaporator V are traversed by air as evenly as possible. After the discharge from the evaporator V, the flow direction is essentially oriented horizontally and perpendicular to the normal driving direction of the motor vehicle. Depending on the valve position of the temperature mixing valve 3, the entire air flow is conducted over the heater H (lower end position of the temperature mixing valve 3), through the heater H (upper end position of the temperature mixing valve 3) or divided such that a partial air flow that corresponds to the valve position is conducted through the heater H and the remaining partial air flow is conducted over the heater H, wherein the partial air flows mix in the downstream mixing area 5. The air distribution valve 4 distributes the tempered air over several air ducts that lead to the individual discharge elements (central and lateral nozzles (driver's seat and front passenger's seat), ventilation nozzles (rear seat area) and discharge elements in the individual footwells (front seat area and rear seat area), defrosting nozzles), wherein only two ducts are indicated in the drawings.

Figure 3:
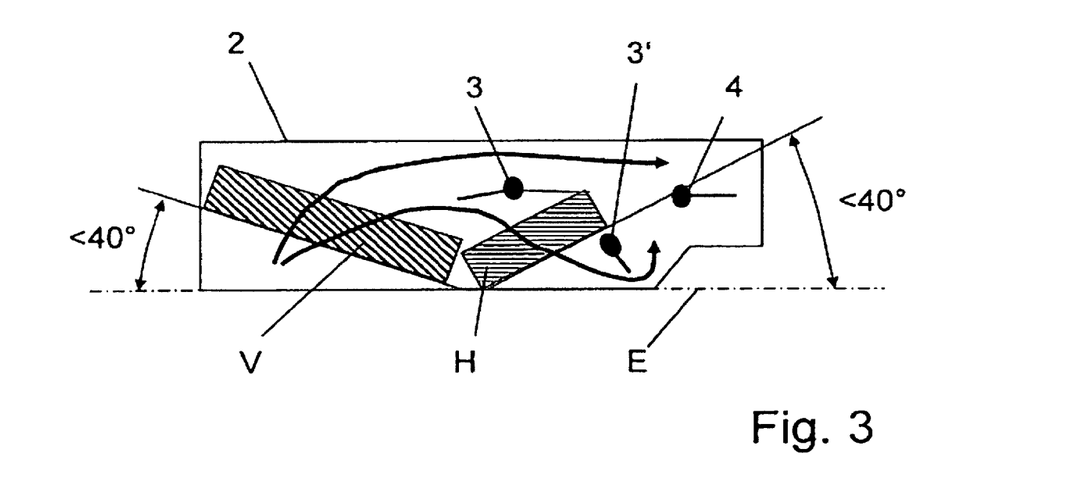
FIG. 3 shows a highly schematic section through a motor vehicle air conditioning system that serves for elucidating a first arrangement of the evaporator and the heater, wherein the air flow path is also illustrated.

FIG. 3 shows a first arrangement of the present invention that slightly differs from the first embodiment, wherein the flow path of the air for a mixing position is illustrated in this figure. According to this first arrangement, the evaporator V and the heater H are arranged adjacent to one another in a V-shaped fashion, namely at a respective angle of less than 40° referred to the horizontal plane E, wherein the adjacent upper edges end in an approximately vertical plane. The upper edge of the evaporator V is arranged above the upper edge of the heater in this case, wherein the respective angle of inclination once again amounts to less than 30°. Consequently, the inflow surface 6 of the evaporator V and the outflow surface 7 of the heater H are accordingly arranged at an angle greater than 120°.

The lower edge of the heater H is arranged slightly lower than the lower edge of the evaporator V. In order to control the air flow, this arrangement is provided with two temperature mixing valves 3, 3', wherein the first temperature mixing valve 3 is arranged above the heater H in accordance with the temperature mixing valve 3 of the first embodiment and has a pivoting axis that is arranged such that it extends approximately at the height of the upper edge of the heater and above the heater H in the central region. The second temperature mixing valve 3' is arranged underneath the heater H, wherein the pivoting axis of this valve is arranged just underneath the upper edge of the heater on the air outflow side and parallel to that of the first air distribution valve 3. An air distribution valve 4 is arranged downstream of a mixing area 5.

Figure 4:
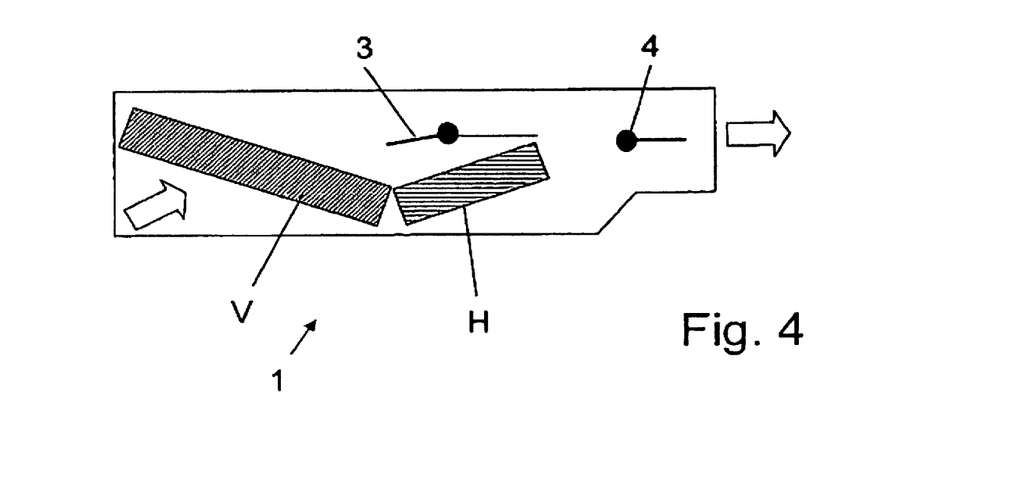
FIG. 4 shows a variation of the first arrangement.

FIG. 4 shows a variation of the first arrangement, in which only one temperature mixing valve 3 is provided. In addition, the lower upper edges of the evaporator V and the heater H end at approximately the same height and directly adjacent to one another. The above-described embodiment therefore corresponds to the variation of the first arrangement that is illustrated in FIG. 4. In this variation, the respective angles of inclination of the two heat exchangers also amount to less than 40°, namely even less than 30° in the present case.

Figure 5:
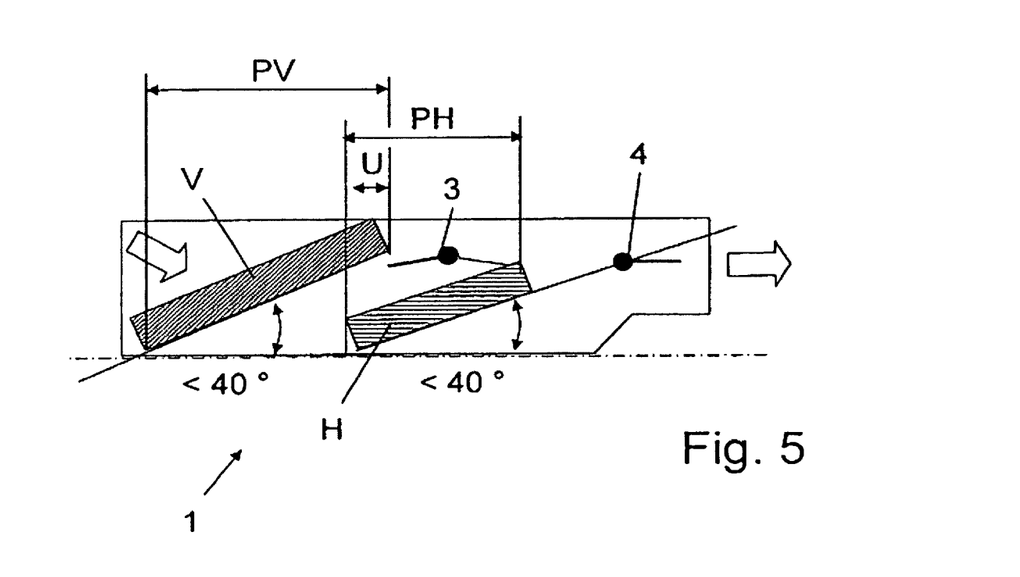
FIG. 5 shows a highly schematic section through a motor vehicle air conditioning system that serves for elucidating a second arrangement of the evaporator and the heater.

According to the second arrangement illustrated FIG. 5, the respective upper edges of both heat exchangers V and H are inclined in the air flow direction, wherein the respective angle of inclination once again amounts to less than 40°, namely once again less than 30° in the present case. The inflow surface 6 of the evaporator V and the outflow surface 7 of the heater H are essentially arranged parallel in this case. In this case, the upper region of the evaporator V is arranged above the lower region of the heater H, i.e., in an overlapping fashion, wherein the overlap U is measured by projecting the heat exchangers on the horizontal plane E (respectively projected inflow or outflow surface of the evaporator PV and the heater PH) and corresponds to no more than one-third of the projected (total) surface PH of the heater H. In the present case, the bottom edges of both heat exchangers are arranged at the same height while the upper edge of the evaporator V is arranged above the heater H.

In order to control the temperature, the present case features only one temperature mixing valve 3 that is arranged above the central region of the heater H approximately at the height of the upper edge of the evaporator V on the outflow side.

Figure 6:
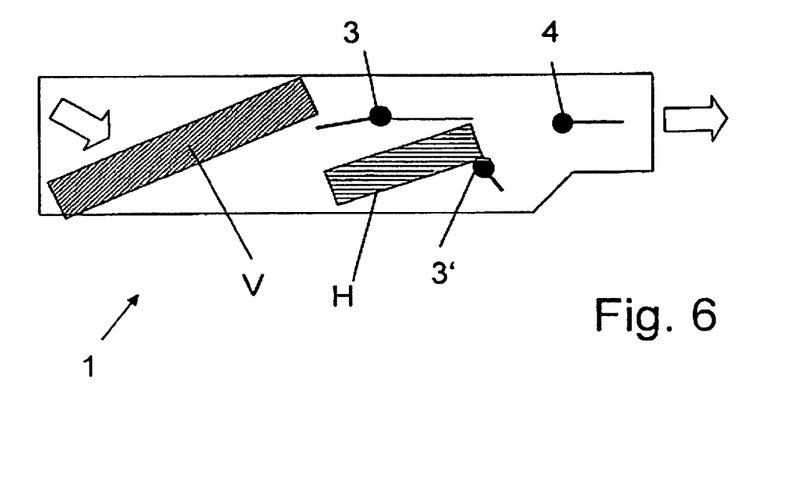
FIG. 6 shows a first variation of the second arrangement.

No overlap is provided in the first variation of the second arrangement that is illustrated in FIG. 6, i.e., the two heat exchangers are arranged adjacent to one another. The angles of inclination correspond to those of the above-described arrangement.

In order to control the temperature, the present case is provided with two temperature mixing valves 3 and 3', wherein the first temperature mixing valve 3 is arranged—in accordance with the second arrangement—above the central region of the heater H approximately at the height of the upper edge of the evaporator V on the outflow side, and wherein the second temperature mixing valve 3' is arranged adjacent to the upper edge of the heater H on the outflow side.

Figure 7:
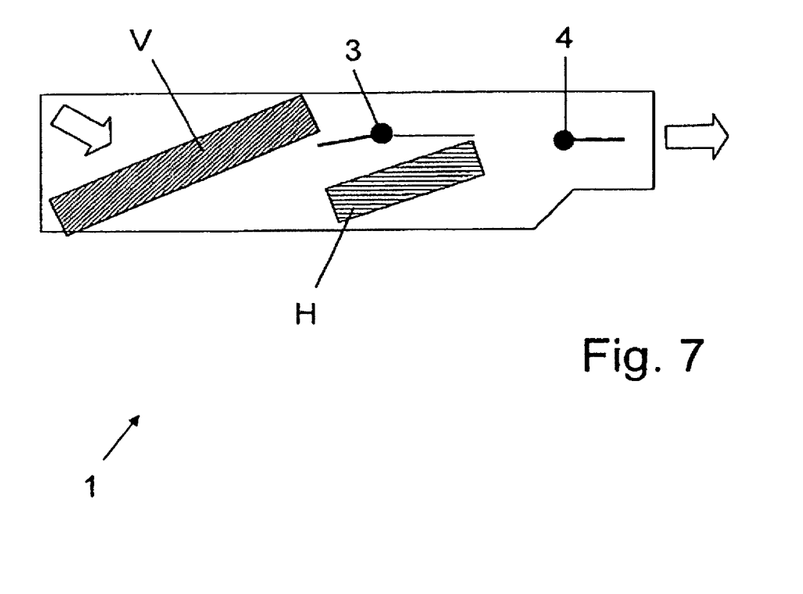
FIG. 7 shows a second variation of the second arrangement.

The second variation of the second arrangement that is illustrated in FIG. 7 corresponds to the above-described first variation, but is provided with only one temperature mixing valve 3, namely the temperature mixing valve that is arranged above the heater H.

Figure 8:
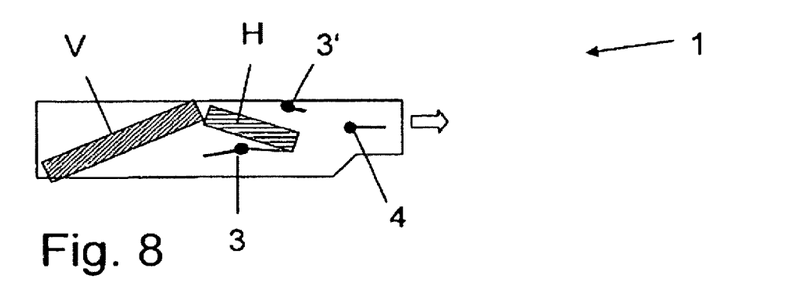
FIG. 8 shows a highly schematic section through a motor vehicle air conditioning system that serves for elucidating a third arrangement of the evaporator and the heater.

According to the third arrangement that is illustrated in FIG. 8, the heat exchangers are arranged in the form of an upside down V or in a roof-like fashion, i.e., the upper edges are positioned directly adjacent to one another. An overlap is not provided in this case. The upper edges of the evaporator V and the heater H are arranged at approximately the same height while the lower edges are clearly offset in height, wherein the evaporator V protrudes farther downward such that an air duct for conducting the air flow or a partial air flow past the heater H remains underneath the heater H. This case is provided with two temperature mixing valves 3 and 3' and an air distribution valve 4 that is arranged downstream of a mixing area. The arrangement essentially corresponds to the arrangement in the first arrangement according to FIG. 3 that is turned by 180°, namely also with respect to the angles of inclination of the heat exchangers.

Figure 9:
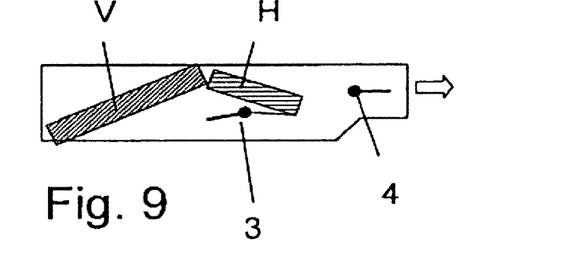
FIG. 9 shows a variation of the third arrangement.

FIG. 9 shows a variation of the third arrangement, in which the second temperature mixing valve 3' is eliminated. In other respects, the design corresponds exactly to the third arrangement such that a detailed description thereof is not provided.

Figure 10:
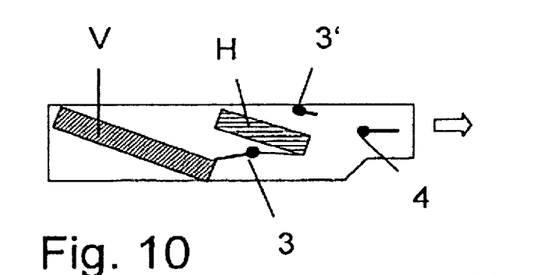
FIG. 10 shows a highly schematic section through a motor vehicle air conditioning system that serves for elucidating a fourth arrangement of the evaporator and the heater.
Figure 11:
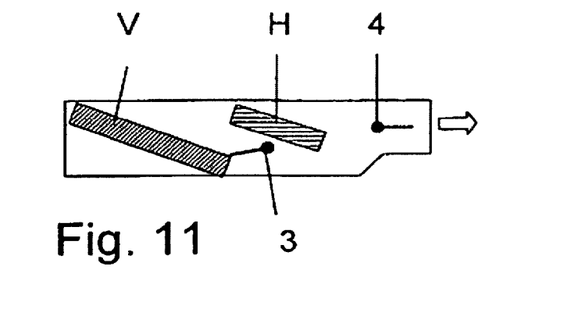
FIG. 11 shows a variation of the fourth arrangement.

The fourth arrangement illustrated in FIG. 10 corresponds to the first variation of the second arrangement according to FIG. 6 that is turned by 180°, namely also with respect to the angles of inclination of the heat exchangers. In the variation according to FIG. 11, the second temperature mixing valve 3' is also eliminated. According to another variation that is not illustrated in the drawings, the evaporator and the heater are arranged such that they overlap in a section, i.e., in accordance with the second arrangement illustrated in FIG. 5. In this case, the projection of the overlap also amounts to no more than one-third of the projection of the heater on the horizontal plane.

Although not explicitly described above, the air conditioning system may also be realized in the form of a multi-zone air conditioning system, particularly a two-zone air conditioning system, i.e., corresponding partition walls and divided valves that can be controlled separately are provided in order to realize an essentially independent air conditioning of the individual zones.

Figure 12:
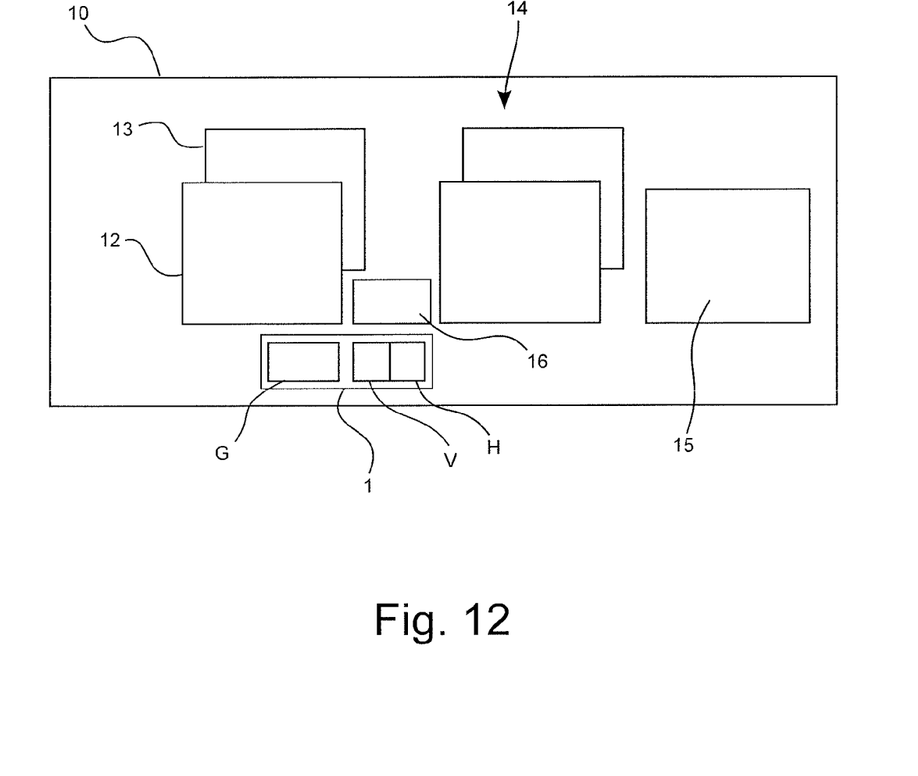
FIG. 12 shows a schematic representation of a vehicle including an embodiment of an air conditioning system.

FIG. 12 shows a schematic representation of a vehicle 10 including a driver's seat 12, a front passenger seat 13, a second row of seats 14 and a trunk 15. The air conditioning system 1 is arranged underneath the driver's seat 12 and a footwell 16 of the second row of seats 14. Specifically, the fan G is arranged under the driver's seat 12 and the evaporator V and heater H are arranged under the footwell 16 of the second row of seats 14.

The invention claimed is:

1. A motor vehicle air conditioning arrangement comprising:
    an air conditioning housing having a horizontal plane (E),
    a fan (G) disposed in the housing for generating air flow,
    an evaporator (V) disposed in the housing and having a planar inlet surface through which the generated air flows perpendicularly,
    a heater (H) disposed in the housing and having a planar inlet surface through which the generated air flows perpendicularly, and
    a mixing valve disposed in the housing upstream of the heater (H),
    wherein the evaporator (V) is inclined relative to the horizontal plane (E) such that the planar inlet surface of the evaporator (V) is disposed at an angle about a first direction of rotation of less than 40° from the horizontal plane (E),
    wherein the heater (H) is inclined relative to the horizontal plane (E) such that the planar inlet surface of the heater (H) is disposed at an angle about a second direction of rotation of less than 40° from the horizontal plane (E), the second direction of rotation being opposite the first direction of rotation, and
    wherein the heater (H) and evaporator (V) are arranged adjacent to one another and the evaporator (V) is disposed upstream of the heater (H),
    wherein the fan (G) is arranged adjacent to the evaporator (V) and the heater (H), and wherein the air generated by the fan (G) is deflected before flowing into the evaporator (V).

2. The motor vehicle air conditioning arrangement according to claim 1, wherein the heater (H) and the evaporator (V) are arranged in a V-shaped fashion.

3. The motor vehicle air conditioning arrangement according to claim 1, wherein the motor vehicle air conditioning arrangement is arranged in a motor vehicle such that air can traverse the evaporator (V) and the heater (H) perpendicular to a driving direction of the motor vehicle.

4. The motor vehicle air conditioning arrangement according to claim 1, wherein the motor vehicle air conditioning arrangement is arranged in a motor vehicle comprising a driver's seat, a front passenger's seat, two or more rows of seats, a footwell and a trunk, wherein the air conditioning arrangement is arranged underneath at least one of the driver's seat or the footwell.

5. The motor vehicle air conditioning arrangement according to claim 4, wherein the fan (G) is arranged in the motor vehicle, upstream of and at the height of the evaporator (V) and the heater (H).

6. The motor vehicle air conditioning arrangement according to claim 4, wherein the fan (G) is arranged underneath the driver's seat and the evaporator (V) and the heater (H) are arranged underneath a footwell of the second row of seats.

* * * * *